3,024,191
FRACTURING EARTH FORMATIONS
Loyd W. Jones, Tulsa, Okla., assignor to Pan American Petroleum Corporation, Tulsa, Okla., a corporation of Delaware
Filed Oct. 28, 1959, Ser. No. 849,312
10 Claims. (Cl. 252—8.55)

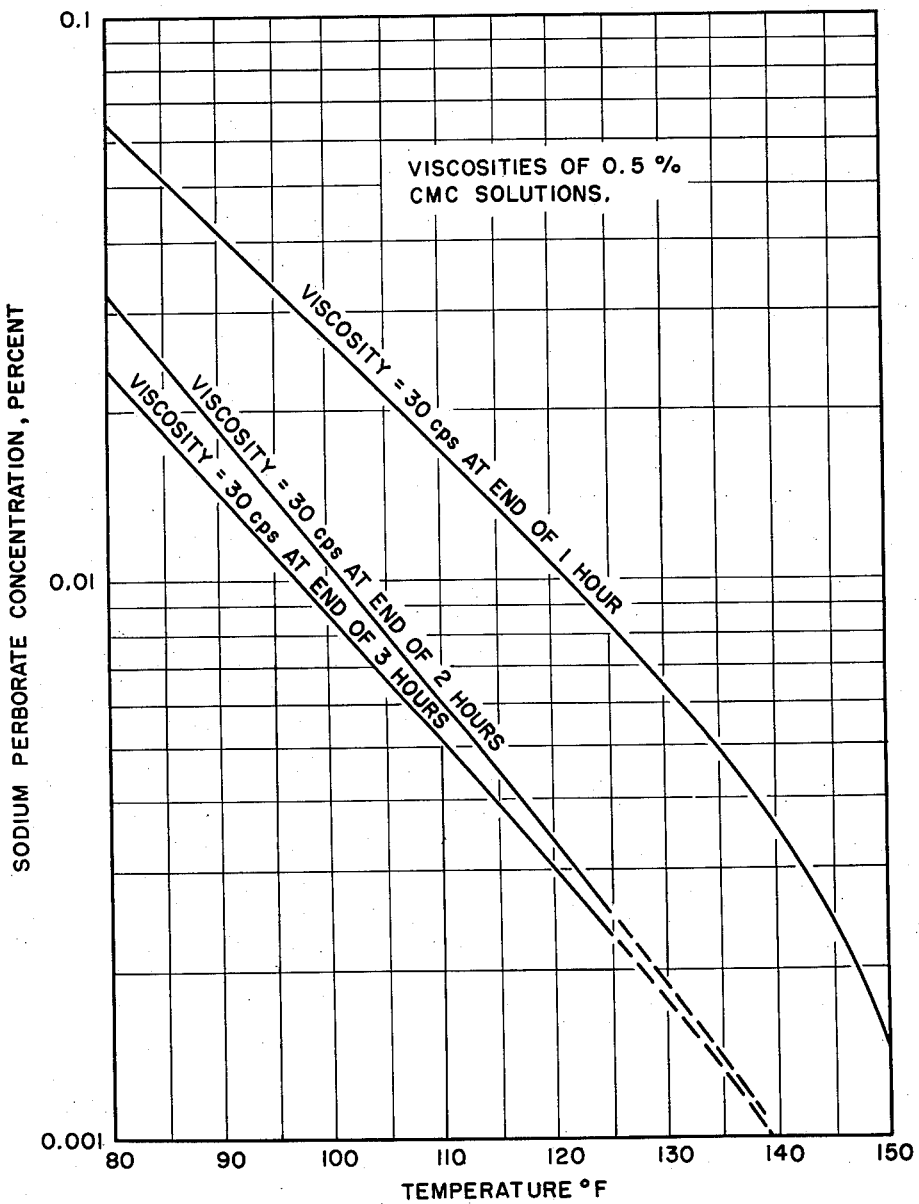

This invention relates to fracturing formations penetrated by wells. More particularly, it relates to an aqueous fracturing fluid capable of transporting large fracture props having a high density.

Recently, there has been a growing interest in two aspects of hydraulic fracturing of formations. First, use of very large fracture props of strong materials, such as aluminum alloys or steel, has been proposed to provide fractures with high flow capacities. Second, use of aqueous fluids to avoid fire hazards has attracted much attention. If aqueous fluids are to be used to transport the large dense props, such as steel balls, the aqueous fluids should be thickened or gelled. Many ways are known for increasing the viscosity and gel strength of water. Inorganic colloids, such as bentonite, can be used. Organic colloids, such as starch and natural water-soluble gums, such as karaya, guar, and the like, may also be employed. These materials, however, present difficulties.

If clay is used, the clay slurry does not lose its viscosity after being injected but remains in the fracture and in the formation to decrease flow of formation fluids to the well. The organic colloids can be treated with acids, oxidizing agents, bacteria, or the like, to decrease the viscosity of the fracturing fluid and facilitate its removal from the formation and fracture. For this reason, the organic colloids are ordinarily preferred. Even these organic colloids, however, present difficulties. If acids, oxidizing agents, bacteria, or the like, are added to the fracturing fluids, they sometimes act so quickly that the viscosity of the fluid is greatly reduced before the propping agents have been properly transported into the desired location. Another serious problem is the solid residue which normally remains after the organic colloid has been attacked by the breaker. In the case of karaya gum, for example, the precipitate is voluminous and can seriously impair the formation permeability if the precipitate forms in the pores of the formation.

An object of this invention is to provide an aqueous fracturing fluid with a high viscosity which will break back to a lower viscosity after a considerable period of time, while forming little or no precipitate. Other objects will be apparent from the following description and claims.

I have found that if carboxymethyl cellulose, hereinafter referred to as CMC, is used as the viscosity increasing agent, and if a perborate is used as an incorporated gel breaker within narrow concentration limits, adequate time is provided for the composition to be used before the viscosity is seriously reduced. Little, if any, precipitate is formed when the viscosity is reduced. These requirements are not met when using other viscosity reducing agents with CMC or when using perborates with other hydratable colloids. The specific combination of CMC and perborates seems to be unique.

In the drawing, the figure shows the concentration range of perborates which should be used to provide one, two, or three hours of time to place a fracturing fluid containing 0.5 percent by weight of a particular CMC. This CMC is described as Hercules CMC-70 C High. This material produces high viscosity in water even when used in low concentration. Ordinarily, 0.5 percent by weight of this particular CMC is adequate to produce a fracturing fluid capable of transporting large heavy props into fractures.

The three curves in the drawing show amounts of sodium perborate which should be used if a viscosity of 30 centipoises is to be retained for one, two, or three hours at various temperatures. These curves can be employed to select the proper composition for use in any well once the depth and bottom hole temperature are known. Ordinarily, the high-viscosity CMC should be used in low concentration. In some cases, however, it may be desired to use other types of CMC or other concentrations. The amount of perborate used in each case will, of course, vary with the type and concentration of CMC employed. The curves in the drawing, however, will serve as a general guide in the selection of a concentration of sodium perborate to employ in a test to determine if the fracturing fluid viscosity will decrease at the desired rate. This can be simply determined by preparing a small sample of the fracturing fluid which is to be used, placing it in an oven set at the bottom hole temperature of the well in which the fluid is to be used, and measuring the viscosity over a period of time. It will be apparent that it will usually be more convenient to use a half percent solution of high-viscosity CMC so that the concentration of perborates can be selected by use of the curves in the drawing.

A viscosity of 30 centipoises has been specified above since a dispersion of CMC more viscous than this is capable of transporting large fracture props in a satisfactory manner. When the viscosity is reduced to a value below about 30 centipoises by the perborate, on the other hand, the fracturing fluid can be easily removed from the formation. Preferably the gel breaker should not decrease the viscosity to a value of 30 centipoises in a time less than one hour in order to allow adequate time for the fracturing operation. The gel breaker should decrease the viscosity to a value no more than 30 centipoises in a period of not more than about 24 hours, however, to permit removal of the fracturing liquid from the formation in a reasonable length of time.

When reference is made to "sodium perborate," the commercially available hydrate having the formula

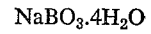

$$NaBO_3 \cdot 4H_2O$$

is intended unless otherwise indicated. When reference is made to "sodium carboxymethyl cellulose," the commercially available forms containing small amounts of impurities and water are likewise intended. Concentrations have been specified with these definitions in mind. The term "high-viscosity sodium carboxymethyl cellulose" indicates the form which by reason of the smaller cellulose molecules produces a higher viscosity than the so-called "medium" or "low" forms.

Sodium perborate is the most readily available of the perborates and is preferred for this reason and because of its low cost. The active portion of sodium perborate however is the perborate radical. This can be provided by any water-soluble perborate salt. The alkali metal perborates are preferred, particularly sodium and potassium perborate. The alkaline earth metal perborate can also sometimes be used.

It should be noted that the acidity of the water has some effect on the rate of action of perborates. If the water is not substantially neutral, it may be advisable to add an acid, such as sulfuric acid, or a base, such as sodium hydroxide, to adjust the acidity to an approximately neutral condition. Buffers may also be used if desired. When sodium perborate itself is used in high concentrations, such as one percent by weight of the water, the water becomes sufficiently basic to affect the rate of action of the perborate. This is an illustration of an instance in which the pH of the solution should be adjusted to nearly neutral.

The water generally should contain no more than two or three thousand parts per million of salt if the CMC is to produce a high viscosity. It is sometimes possible to form a suitable CMC dispersion in water containing a larger amount of salt by mixing the CMC first in substantially salt-free water to form a solution containing a high concentration of CMC, and then diluting this primary solution with the water containing a high salt content. It is also possible to form CMC gels in salt water by mixing very finely divided CMC powder with a non-aqueous liquid, such as ethyl alcohol, kerosene, or the like, before adding the material to the brine. If possible, substantially fresh water should be used to form the fracturing fluid.

It will be apparent that fracturing fluids which do not have a neutral pH and which contain considerable amounts of salts can be used in some cases. It is preferred, however, to employ fluids which are substantially neutral and substantially free from salts other than perborates. The term "substantially neutral" should be interpreted to mean having a pH between about 6 and about 8. The term "substantially free from salt" should be interpreted to mean that the fluid contains no more than about two or three thousand parts per million of salts other than perborates. The term "consisting essentially of" is intended to include the named ingredients plus others, such as acids, bases, buffers, and the like, used to adjust the pH, propping agents, small amounts of salts and the like, which do not substantially adversely affect the properties of the compositions or the action of the perborates. The term is intended to exclude high concentrations of alkali metal salts and the like which do adversely affect the properties to a substantial degree.

To determine if other viscosity breakers could be used to provide an extended period of time before the viscosity was seriously reduced and could avoid a precipitate, several breakers were added to one percent solutions of CMC–70 C High in fresh water. In preparing the fluids, the CMC was first stirred into the water for two minutes. The indicated concentration of gel breaker was then added and the viscosity was measured at 78° F. after three minutes and after 30 minutes. The fluids were then placed in an oven at 125° F. and the viscosity was measured after 60 minutes, 150 minutes, and 270 minutes. The results are presented in Table 1. The viscosities reported were determined by means of a Gardner Mobilometer. All other viscosities mentioned herein, such as those specified in the drawing and claims, are in centipoises as measured on a Stormer viscosimeter rotating at about 600 r.p.m.

Table 1

| Amount and composition of added gel breaker | Viscosity, centipoises, after— | | | | | Remarks |
|---|---|---|---|---|---|---|
| | 3 min. | 30 min. | 60 min. | 150 min. | 270 min. | |
| 1% hydrochloric acid | 100 | 76 | 57 | 46 | 44 | Turbid. |
| 3.3% sodium acid sulfate | 110 | 43 | 28 | 32 | 27 | Do. |
| 2.3% sulfamic acid | 135 | 75 | 46 | 19 | 19 | Do. |
| 1% sodium hypochlorite | 290 | 145 | 37 | 20 | 22 | Do. |
| 1% sodium acid pyrophosphate, anhydrous | 515 | 293 | 119 | 66 | 54 | Do. |
| 7.9 ml. 0.1 N hydrochloric acid plus 0.124 g. calcium hypochlorite per 250 ml. solution | 1,120 | 300 | 140 | 25 | 25 | Do. |
| 0.05% chloramine T plus 2.75 ml. 0.1 N hydrochloric acid/250ml | 570 | 490 | 230 | 145 | 110 | Do. |
| 1% sodium perborate (NaBO₃·4H₂O) | 220 | 218 | 82 | 23 | 23 | Clear. |

It will be noted that in the presence of 1 percent hydrochloric acid the CMC developed a viscosity of only 100 centipoises compared to 220 in the presence of sodium perborate. It will be apparent that the CMC with perborate is much more effective in transporting propping agents than the CMC solution containing hydrochloric acid. The next best known gel breaker in the table is sodium hypochlorite. While the CMC gel containing this material had a viscosity of 290 centipoises initially, it will be noted that after 60 minutes the viscosity had fallen to 37 centipoises. This is in contrast to 82 centipoises after the CMC solution containing perborates had stood for one hour. In all cases the most serious disadvantage of using gel breakers other than perborates was the presence of a precipitate at the end of a 24-hour period. It will be noted that the perborates, on the other hand, broke the gel without producing a substantial volume of precipitate. Additional rough screening tests with still other materials, such as hydrogen peroxide, failed to discover other gel breakers which would produce a clear final solution.

In another series of tests, efforts were made to prepare fracturing fluids using other organic colloids with sodium perborate as an incorporated gel breaker. In this work, batu gum failed to form a viscous gel when used in water alone. Karaya gum formed a satisfactory gel which was broken by the perborates. The difficulty was that a large mass of precipitated solids resulted. When sodium perborate was added to a 1 percent solution of guar gum, the entire mass solidified. After several days standing at room temperature, the mass was still a solid. Little, if any, breaking of the gel occurred. Of the organic colloids tested, starch seemed most comparable to CMC. Even starch, however, produced a considerable solid residue when treated with sodium perborate. It will be apparent from the above tests that the combination of perborates with CMC is unique for the intended purpose.

I claim:

1. A composition suitable for fracturing a formation penetrated by a well and for carrying large props into the fracture consisting essentially of water, sufficient of an alkali metal carboxymethyl cellulose to increase the viscosity of the resulting aqueous solution to a value greater than 30 centipoises, and sufficient of an alkali metal perborate to decrease the viscosity of the solution to a value of 30 centipoises in a time between about 1 and about 24 hours at the temperature of the formation to be fractured, whereby the solution may be withdrawn, leaving the formation and fracture substantially free from the solid residue characteristically produced by other hydratable colloids and other gel breakers.

2. The composition of claim 1 in which said alkali metal carboxymethyl cellulose is sodium carboxymethyl cellulose.

3. A composition for fracturing a formation penetrated by a well and for carrying large props into the fracture consisting essentially of an aqueous solution of an alkali metal carboxymethyl cellulose, said carboxymethyl cellulose being present in an amount sufficient to increase the viscosity of the solution to a value in excess of 30 centipoises, said solution being substantially neutral and substantially free from salts other than an alkali metal perborate, said perborate being present in an amount sufficient to decrease the viscosity of the solution to a value of 30 centipoises in a time between about 1 and about 24 hours at the temperature of the formation to be fractured, whereby the solution may be withdrawn leaving the formation and fracture substantially free from the solid residue characteristically produced by other hydratable colloids and other gel breakers.

4. The composition of claim 3 in which said alkali metal carboxymethyl cellulose is sodium carboxymethyl cellulose.

5. A composition suitable for fracturing a formation penetrated by a well consisting essentially of water, from about 0.5 to about 1.0 percent by weight of high-viscosity sodium carboxymethyl cellulose and from about 0.002 to about 0.1 percent by weight of sodium perborate whereby the solution remains viscous for an extended period of time, but eventually becomes non-viscous, remaining substantially clear and free from solid residues produced by the reaction of other hydratable colloids and other gel breakers.

6. In the method of fracturing a formation penetrated by a well in which a thickened fracturing fluid is injected into the well to fracture the formation and transport props into the fracture, the improvement comprising injecting into the well a fracturing fluid consisting essentially of water, sufficient of an alkali metal carboxymethyl cellulose to increase the viscosity of the resulting aqueous solution to a value greater than 30 centipoises, and sufficient of an alkali metal perborate to decrease the viscosity of the solution to a value of 30 centipoises in a time between about 1 and about 24 hours at the temperature of the formation to be fractured, and withdrawing the fracturing fluid at a reduced viscosity to leave the formation and fracture substantially free from the solid reaction products characteristically produced by other hydratable colloids and other gel breakers.

7. The method of claim 6 in which said alkali metal carboxymethyl cellulose is sodium carboxymethyl cellulose.

8. In the method of fracturing a formation penetrated by a well in which a thickened fracturing fluid is injected into the well to fracture the formation and transport props into the fracture, the improvement comprising injecting into the well a fracturing fluid consisting essentially of an aqueous solution of an alkali metal carboxymethyl cellulose, said carboxymethyl cellulose being present in an amount sufficient to increase the viscosity of the solution to a value in excess of 30 centipoises, said solution being substantially neutral and substantially free from salts other than an alkali metal perborate, said perborate being present in an amount sufficient to decrease the viscosity of the solution to a value of 30 centipoises in a time between about 1 and about 24 hours at the temperature of the formation and withdrawing the fracturing fluid at a reduced viscosity to leave the formation and fracture substantially free from the solid reaction products characteristically produced by other hydratable colloids and other gel breakers.

9. The method of claim 8 in which said alkali metal carboxymethyl cellulose is sodium carboxymethyl cellulose.

10. In the method of fracturing a formation penetrated by a well in which a thickened fracturing fluid is injected into the well to fracture the formation and transport props into the fracture, the improvement comprising injecting into the well a fracturing fluid consisting essentially of water, from about 0.5 to about 1.0 percent by weight of a high-viscosity sodium carboxymethyl cellulose, and from about 0.002 to about 0.1 percent by weight of sodium perborate and withdrawing the fracturing fluid at a reduced viscosity to leave the formation and fracture substantially free from the solid reaction products characteristically produced by other hydratable colloids and other gel breakers.

References Cited in the file of this patent

UNITED STATES PATENTS

| | | |
|---|---|---|
| 2,335,194 | Nusslein et al. | Nov. 23, 1943 |
| 2,596,844 | Clark | May 13, 1952 |
| 2,681,704 | Menaul | June 22, 1954 |